United States Patent [19]
Onodera

[11] Patent Number: 5,709,602
[45] Date of Patent: Jan. 20, 1998

[54] CONSTRUCTION OF AIR CONDITIONING LOUVER

[75] Inventor: Mitsuhiro Onodera, Hamamatsu, Japan

[73] Assignee: Suzuki Motor Corporation, Shizuoka-ken, Japan

[21] Appl. No.: 695,973

[22] Filed: Aug. 13, 1996

Related U.S. Application Data

[63] Continuation of Ser. No. 365,496, Dec. 28, 1994, abandoned.

[30] Foreign Application Priority Data

Jan. 17, 1994 [JP] Japan ................................. 6-002998

[51] Int. Cl.⁶ ........................ B60H 1/34; F24F 13/14
[52] U.S. Cl. ........................ 454/155; 454/315; 454/319
[58] Field of Search ........................ 454/155, 202, 454/313, 315, 318, 319

[56] References Cited

U.S. PATENT DOCUMENTS

| | | | |
|---|---|---|---|
| 1,655,073 | 1/1928 | Riker | 454/319 |
| 3,122,087 | 2/1964 | Oemuth et al. | 454/319 X |
| 4,607,565 | 8/1986 | Sugawara et al. | |
| 4,693,176 | 9/1987 | Deeg et al. | |

FOREIGN PATENT DOCUMENTS

| | | | |
|---|---|---|---|
| 165267 | 9/1955 | Australia | 454/315 |
| 2144494 | 3/1973 | Germany | 454/319 |
| 3524463 | 2/1987 | Germany | 454/155 |
| 402312 | 1/1992 | Germany | |

*Primary Examiner*—Harold Joyce
*Attorney, Agent, or Firm*—Fish & Richardson P.C.

[57] ABSTRACT

A construction of air conditioner louver having a louver body in which the air inflow side and the air blowout side communicate with one another, and a plurality of rotatable fins for regulating wind direction which are disposed at predetermined intervals via a rotating shaft in the louver body, wherein the fin is bent at a position near the rotating shaft portion and is formed into a bent plate shape such that both end portions are disposed downward.

1 Claim, 3 Drawing Sheets

CONSTRUCTION OF AIR CONDITIONING LOUVER

This is a continuation of application Ser. No. 08/365,496, filed Dec. 28, 1994 abandoned.

FIELD OF THE INVENTION AND RELATED ART STATEMENT

The present invention relates to a construction of air conditioner louver for motor vehicles etc.

Conventionally, louvers 51 for blowing air conditioning wind as shown in FIG. 4 are disposed at the center of automobile instrument panel, at the side of driver's seat, and at the side of assistant driver's seat. In a louver body 52 of the louver 51, vertical fins 53 and horizontal fins 54 are provided to regulate wind direction in the right-and-left direction and the up-and-down direction, respectively. By moving these fins 53 and 54, the direction of wind to the cabin inside R can be regulated.

As shown in FIG. 4 and 5, the conventional fin 54 for regulating wind direction is formed into a flat plate shape, and configured so as to rotate around a pin 55 together with other fins. Therefore, in order to obtain a large blowout angle $\alpha$, it is necessary to increase the operation angle (the angle formed by the fin 54 and the wind input) $\alpha'$ of the fin 54 which is equal to the blowout angle $\alpha$. Especially in the louver 51 in which the vertical fins 53 for regulating the right-and-left direction are arranged on the front side (cabin inside R side) and the horizontal fins 54 for regulating the up-and-down direction are arranged on the back side, the wind directivity in the up-and-down direction tends to become poor. To solve this problem, the operation angle $\alpha'$ of the fine 54 is set so as to be large. In FIG. 5, the arrow a indicates the wind input and its direction, and the arrow b indicates the wind output and its direction.

However, for the above-described conventional construction of air conditioner louver, when the operation angle $\alpha'$ of the fin 54 is increased to increase the blowout angle $\alpha$, wind separates from the fin 54, which poses a problem in that the intended blowout angle $\alpha$ cannot be obtained. This separation occurs especially when the operation angle $\alpha'$ of the fin 54 is large. Further, the interference between the fin 54 and the input wind a increases, so that there is a possibility of increased noise. Moreover, the conventional construction of the air conditioner louver has a disadvantage that a necessary air quantity cannot be obtained because the region of the loss portion B is larger than the region of the effective portion A of wind as shown in FIG. 4.

OBJECT AND SUMMARY OF THE INVENTION

The present invention was made to solve the above problems. Accordingly, an object of the present invention is to provide a construction of air conditioner louver in which a desired blowout angle can be obtained without increasing the operation angle of fin for regulating wind direction, the wind noise caused when wind passes through the fins for regulating wind direction is low, and the loss of air quantity is low.

To solve the problems which the prior art has, the present invention provides a construction of air conditioner louver having a louver body in which the air inflow side and the air blowout side communicate with one another, and a plurality of rotatable fins for regulating wind direction which are disposed at predetermined intervals via a rotating shaft in the louver body, wherein the fin is bent at a position near the rotating shaft portion and is formed into a bent plate shape such that both end portions are disposed downward.

A construction of air conditioner louver in accordance with the present invention has a louver body in which the air inflow side and the air blowout side communicate with one another, and a plurality of rotatable fins for regulating wind direction which are disposed at predetermined intervals via a rotating shaft in the louver body, and the fin is bent at a position near the rotating shaft portion and is formed into a bent plate shape in which both end portions are disposed downward. Therefore, the fin operation angle which is necessary to obtain the same blowout angle as that of the conventional louver construction can be decreased.

As described above, a construction of air conditioner louver in accordance with the present invention has a louver body in which the air inflow side and the air blowout side communicate with one another, and a plurality of rotatable fins for regulating wind direction which are disposed at predetermined intervals via a rotating shaft in the louver body, and the fin is bent at a position near the rotating shaft portion and is formed into a bent plate shape in which both end portions are disposed downward. Therefore, a desired blowout angle can be obtained easily and reliably without increasing the fin operation angle, like the conventional louver construction, when the fins are disposed in the louver body. Also, the interference between the fin and the input wind decreases, so that the noise caused when wind passes through the fins can be kept low. Further, for the construction of air conditioner louver of the present invention, the region of the loss portion of wind located at the lower portion of the louver body can be decreased. Therefore, the loss of air quantity can be decreased, so that the air quantity supplied into the cabin can be ensured sufficiently.

DETAILED DESCRIPTION OF PREFERRED EMBODIMENTS

Figure 1:
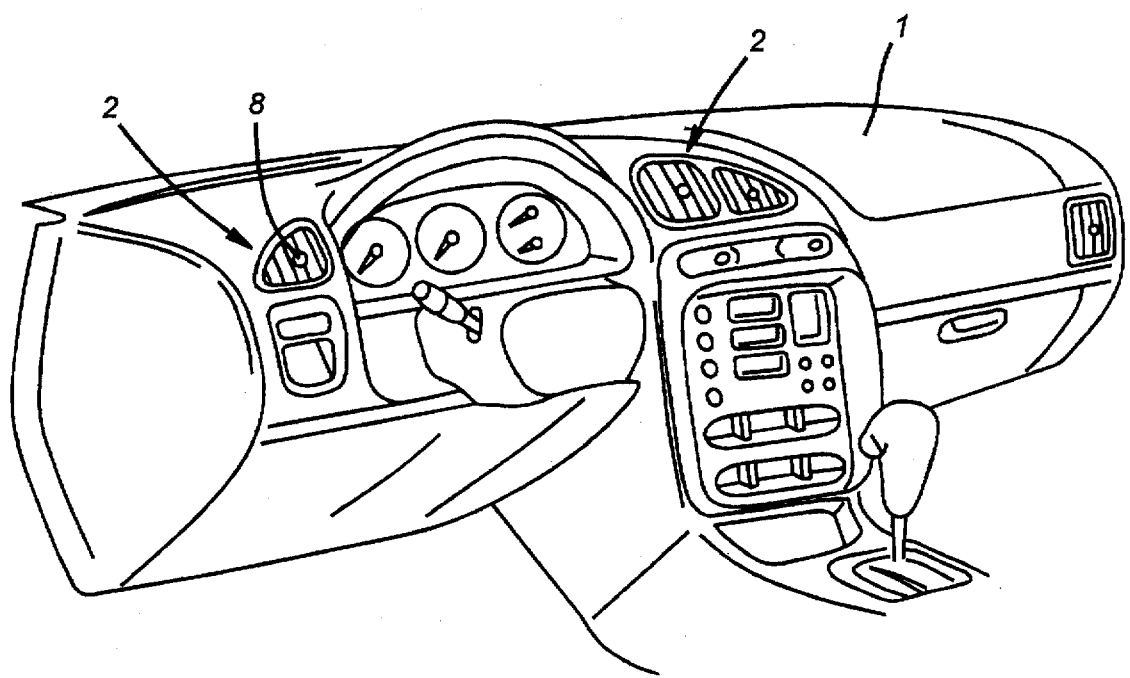
FIG. 1 is a perspective view of an automobile instrument panel to which a construction of air conditioner louver in accordance of one embodiment of the present invention is applied.

The present invention will be described in detail below with reference to the embodiment shown in the drawings.

Figure 2:
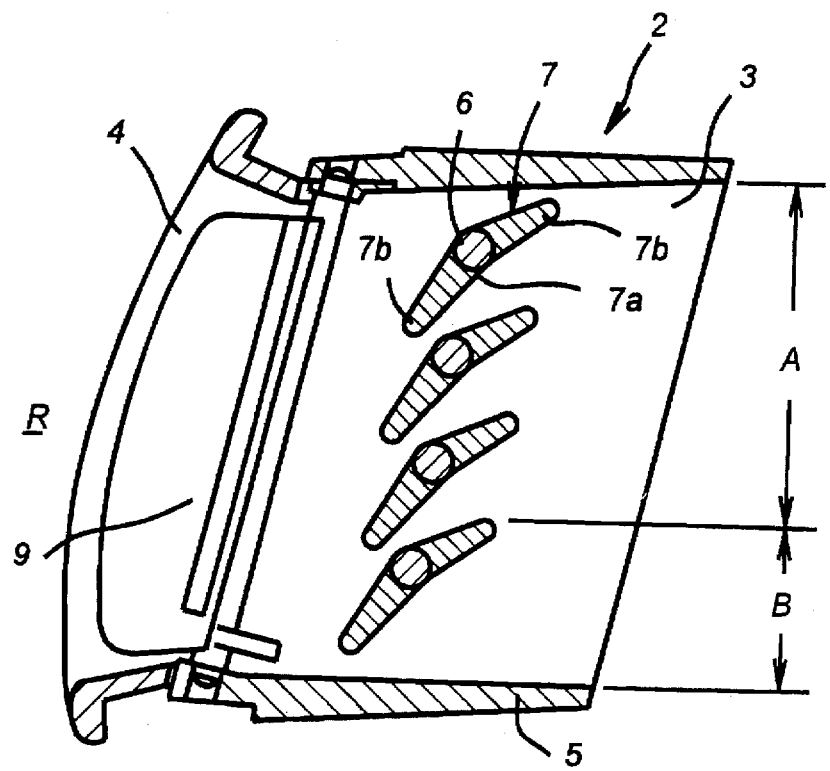
FIG. 2 is a sectional view of a louver in the construction of air conditioner louver of the aforementioned embodiment.
Figure 3:
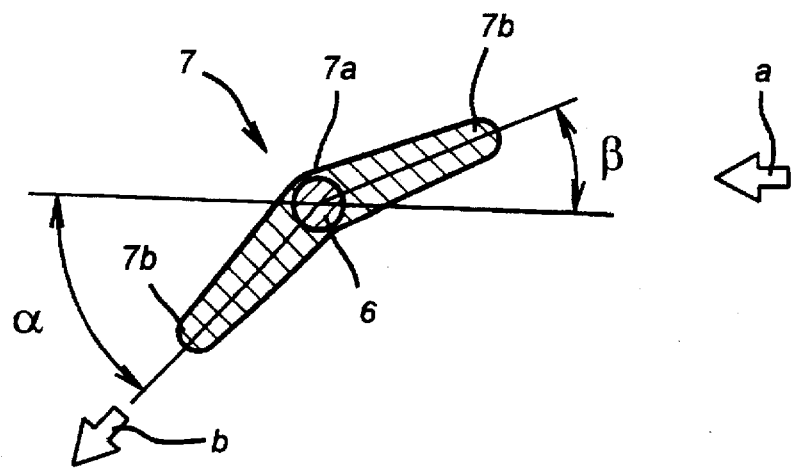
FIG. 3 is a sectional view showing the relationship between the operation angle of fin and the blowout angle for the construction of air conditioner louver of the aforementioned embodiment.

FIGS. 1 to 3 show an embodiment of a construction of air conditioner louver of the present invention. In FIG. 1, reference numeral 1 denotes an automobile instrument panel to which the construction of air conditioner louver of this embodiment is applied. Louvers 2 for blowing air conditioning wind are disposed at the center of the instrument panel 1, at the side of driver's seat, and at the side of assistant driver's seat.

The louver 2 has a tubular louver body 5, in which an air inflow side 3 and an air blowout side 4 communicate with one another, and a plurality of fins 7 for regulating wind direction, which are disposed in parallel in the up-and-down direction at predetermined intervals via a rotating shaft 6 in the louver body 5. These fins 7 are configured so as to be rotatable around the rotating shaft 6. These fins 7 are connected to each other with a connecting link (not shown) on the air inflow side 3, so that all of them are operated simultaneously in the same manner by the operation of a knob 8.

The fins 7 are disposed on the air inflow side (the back side of louver body 5) 3 as horizontal fins for regulating the up-and-down direction of wind. On the air blowout side 4 located in front of these fins 7, a plurality of vertical fins 9 for regulating the right-and-left direction of wind are disposed. These vertical fins 9 have a rotatable construction like the fins 7, and are disposed in parallel in the right-and-left direction at predetermined intervals via a rotating shaft (not shown) in the louver body 5. Therefore, the louver 2 of this embodiment is configured so that the wind direction to the cabin inside R can be regulated by rotating the horizontal fins 7 and the vertical fins 9 in the up-and-down direction and the right-and-left direction, respectively.

As shown in FIGS. 2 and 3, the fin 7 is constructed so that one plate-shaped body is bent at a position near the rotating shaft portion 7a located substantially at the center in the longitudinal direction, and is formed into a bent plate shape such that both end portions 7b are disposed at a downwardly directed acute angle. Specifically, the fin 7 is formed substantially into the sectional shape of "" with the angle of the lower surface side (measured between the lower surface of the end portion upstream of air inflow and the upper surface of the end portion of the next lower adjacent fin) being smaller than the angle of the upper surface side (measured from the upper surface of one end portion of a fin to the upper surface of the other end portion of the same fin) when it is disposed in the louver body 5. Therefore, the blowout angle $\alpha$, which is the angle formed by the fin 7 and the wind input a, is larger than the operation angle $\beta$, which is the angle formed by the fin 7 and the wind input a. Conversely, the operation angle $\beta$ is formed so as to be smaller than the blowout angle $\alpha$. That is to say, the relationship between the blowout angle $\alpha$ (for example, 50° in FIG. 3) and the operation angle $\beta$ (for example, 25° in FIG. 3) is set so as to be always "$\alpha > \beta$". As a result, for the louver 2 of this embodiment, the blowout angle $\alpha$ can be made large without increasing the operation angle $\beta$ of the fin 7.

Further, the sectional shape of the fin 7 is so formed that the thickness is largest at the rotating shaft portion 7a and decreases to each end portion 7b as shown in FIG. 3. This sectional shape allows the wind inputted to the air inflow side 3 of the louver body 5 to flow smoothly when passing through the fins 7 and blowout to the cabin inside R through the air blowout side 4. In FIG. 2, reference character A denotes the region of effective portion of wind located at the upper portion of the louver body 5, while B denotes the region of loss portion of wind located at the lower portion of the louver body 5.

Figure 4:
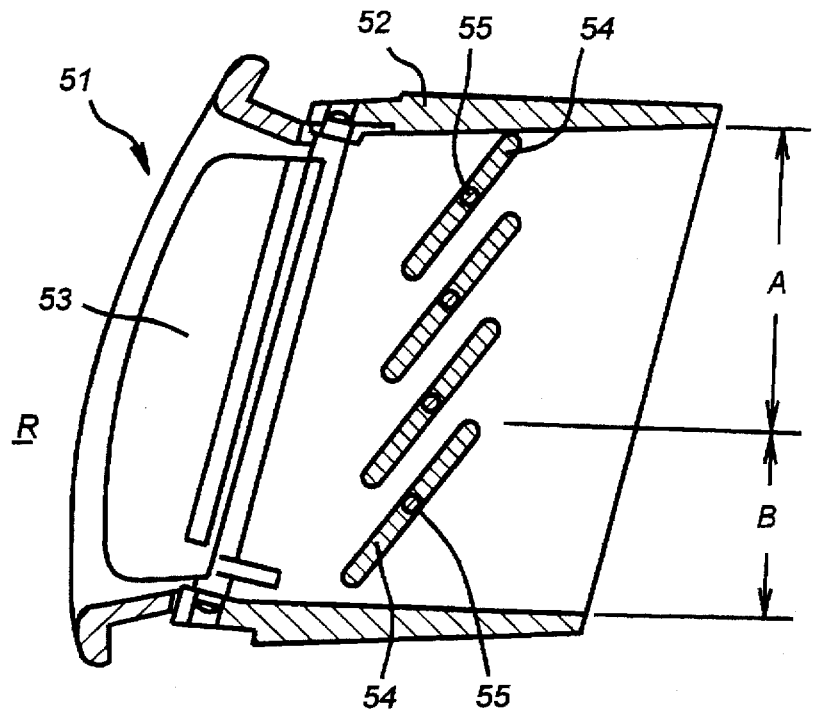
FIG. 4 is a sectional view of a louver in the conventional construction of air conditioner louver.
Figure 5:
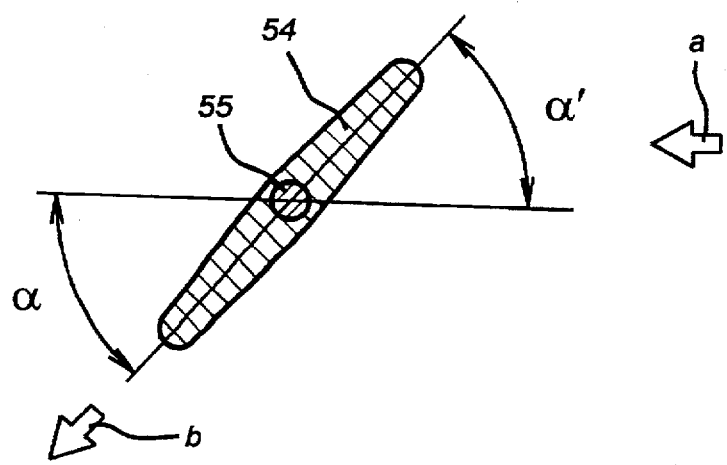
FIG. 5 is a sectional view showing the relationship between the operation angle of fin and the blowout angle for the conventional construction of air conditioner louver.

The construction of air conditioner louver of this embodiment uses bent plate shaped fins 7 for regulating wind direction in which both end portions 7b are disposed downward and the cross section is formed substantially into the shape of "". Therefore, the operation angle $\beta$ of the fin 7 can be made smaller than that of the conventional louver construction when the fins 7 are disposed in the louver body 5, and the adverse effect such as the separation of wind occurring when the operation angle $\beta$ is increased can be decreased, so that the intended blowout angle $\alpha$ can be obtained easily. Moreover, the noise due to the interference between the fin 7 and the input wind a can be kept low. Also, for the louver 2 of this embodiment, the loss of air quantity can be decreased because the region of the loss portion B of wind is small as compared with the conventional louver as shown in FIG. 4. Further, the sectional shape of the fin 7 of this embodiment is so formed that the thickness is largest at the rotating shaft portion 7a and decreases to each end portion 7b as shown in FIG. 3, so that the wind inputted to the air inflow side 3 of the louver body 5 flows smoothly when passing through the fins 7 and blows out to the cabin inside R through the air blowout side 4.

Although the present invention has been described in its preferred form, it is to be understood that the present invention is not limited to the above-described embodiment and many changes and variations are possible in light of the above teachings.

For example, although the louver 2 of the above-described embodiment has vertical fins 9 on the air blowout side 4 in front of the fins 7 for regulating wind direction, the construction of air conditioner louver of the present invention can be applied to a louver which has only fins 7 for regulating wind direction, and no vertical fins 9.

I claim:

1. An air conditioner louver having a body in which the air inflow side and the air blowout side communicate with one another, comprising:

a plurality of rotatable fins for regulating air blowout flow direction, a plurality of rotatable shafts in said louvered body, each of said fins being disposed on one of said rotating shafts in said louvered body, wherein said body is a cylindrical section having upstream and downstream ends and upper and lower portions, said upper portion, on its upstream end, overhanging the lower portion on its upstream end, said shafts being progressively vertically offset from one another;

wherein each of said fins include two end portions, each of said end portions having a flat blade shape, said end portions of each fin intersecting at a position near the rotating shaft and said end portions of each fin being disposed at an angle to one another, the distance measured from the free end of one end portion of each fin to the free end of the other end portion of each fin is less than the combined lengths of said end portions of each fin;

each of said fins tapering in thickness as it extends outwardly away from the shaft to its end portion, all of said fins being disposed in said body between said upper and lower portions and each of said fins being oriented similarly to each of the other fins; and each of said fins having an operation angle, which is the angle formed by one end portion of said fin and the air inflow direction, each of said fins having a blowout angle which is the angle between the air inflow direction and the other end portion of said fin, said fins being shaped so that said fins may be rotated to a position wherein their operation angle is smaller than their blowout angle, one of said end portions of each fin being parallel to an end portion of the other fin, said end portions have upper and lower surfaces, the angle between the lower surface of an upstream end portion of one fin and the upper surface of the upstream end portion of the adjacent fin is less than the angle between the upper surfaces of the end portions of each fin.

* * * * *